Patented Sept. 10, 1940

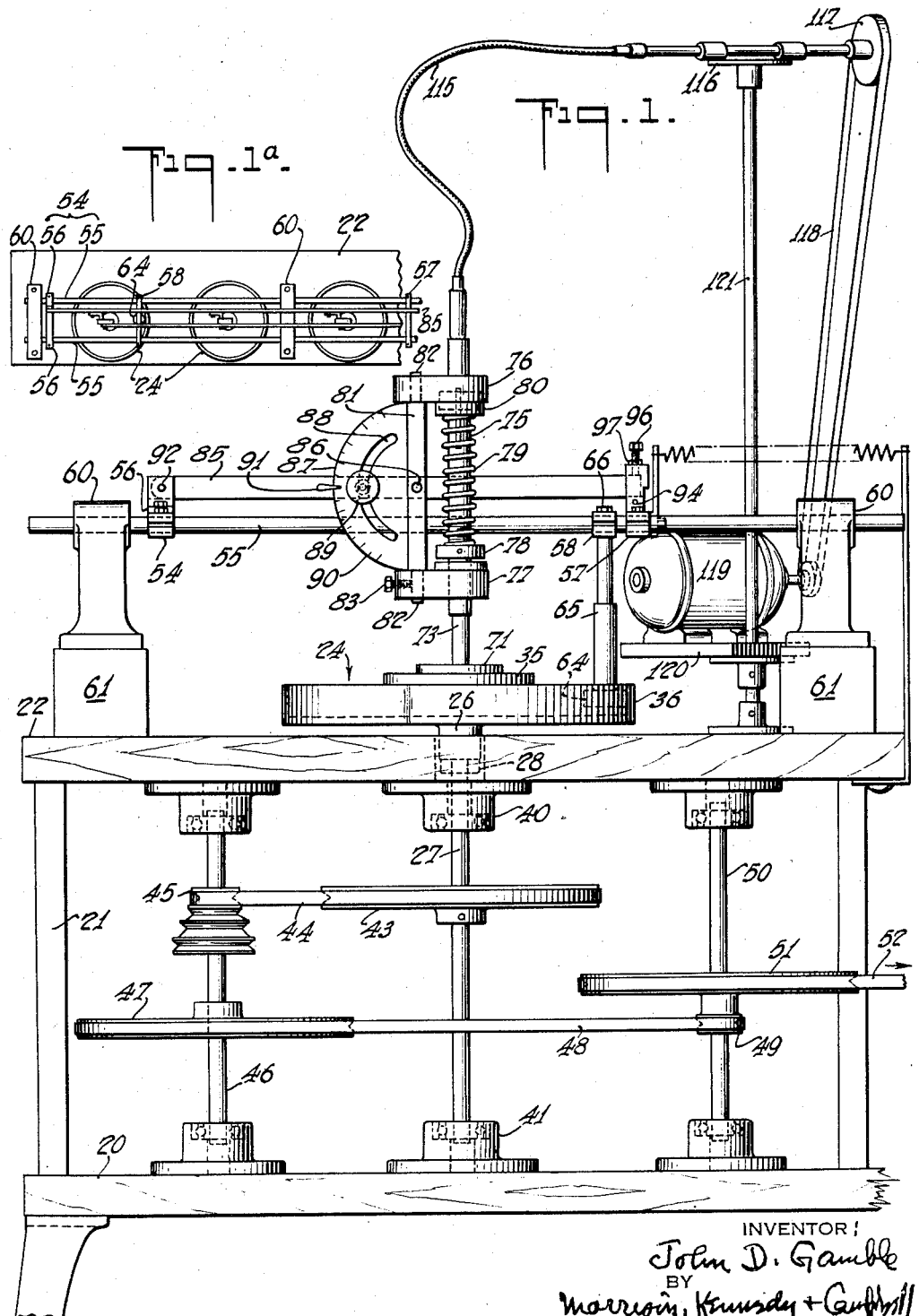

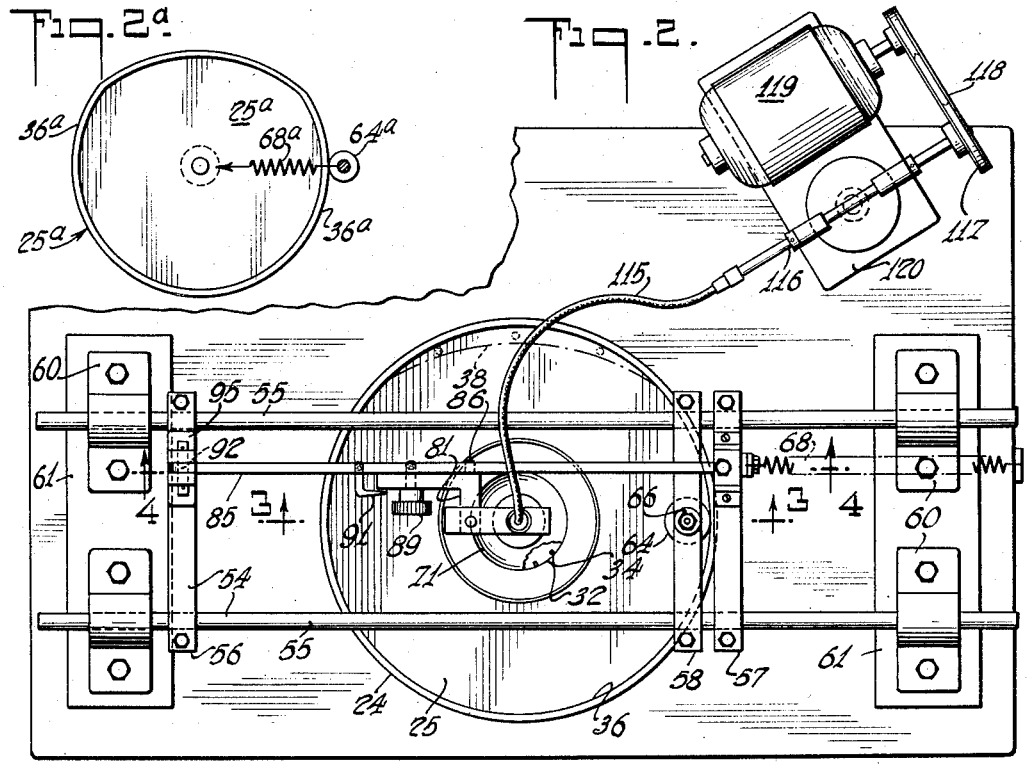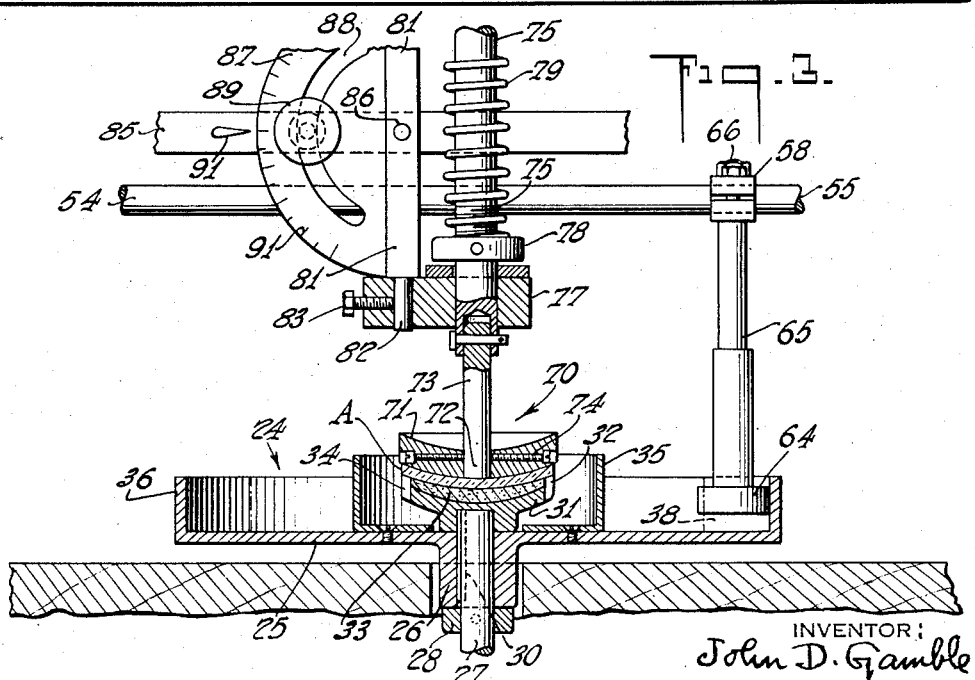

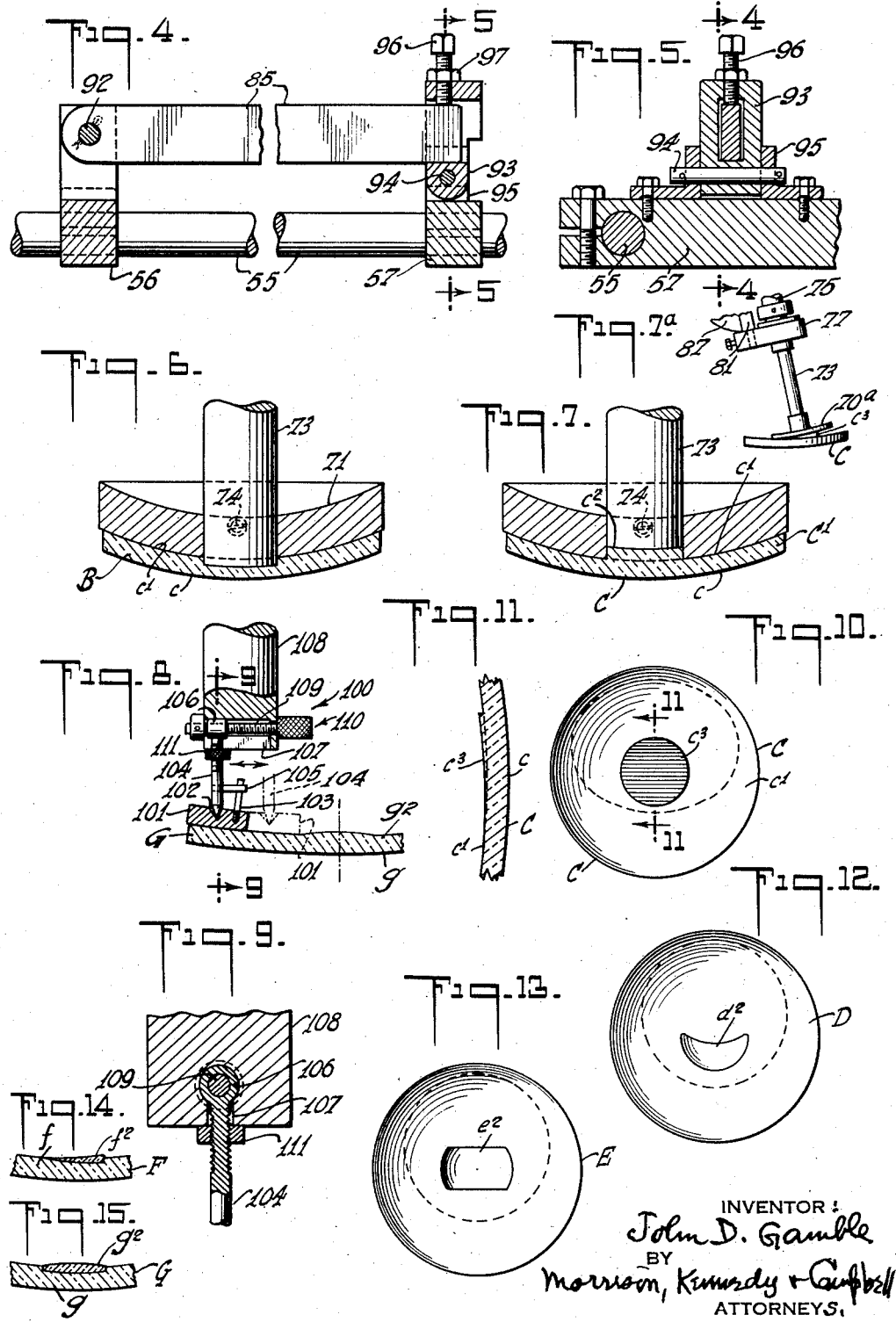

2,213,958

UNITED STATES PATENT OFFICE 2,213,958

LENS MANUFACTURE

John D. Gamble, Forest Hills, N. Y.

Application May 27, 1937, Serial No. 145,028

7 Claims. (Cl. 51—56)

This invention relates to lens manufacture, particularly the production of bifocal lenses, and includes not only the herein disclosed apparatus or machine but the described method of manufacture and certain novel products or lenses; the term bifocal being intended to include trifocal or other multifocal lenses. The invention has to do particularly with the reduction of a suitable glass blank to form the desired lens, which reduction includes the steps of first grinding or machining to shape, and then finishing or polishing the surface or surfaces.

The principal field for which the present invention is intended is the manufacture of the lenses of eyeglasses (including spectacles), particularly lenses composed of a single piece of glass (or equivalent lens material) having two or more lens areas, usually a minor area for near or reading vision and a general or major area for far or distance vision, with differing dioptric powers. Lenses of this sort are of course well known, shaped usually from a preformed glass blank that may be convex at the front or outer and concave at the back or inner surface, the operation involving the reshaping of one side, preferably the back or concave surface, to produce the desired near-vision and far-vision areas, and in a manner to afford a merging of the respective areas and of the resulting visual images, and to eliminate objectionable prismatic effects and avoid jumping of images when vision crosses the division line between the respective areas, which usually are of different diopter or optical radius, and usually are substantially smooth, uninterrupted or tangential in contour. The art knows several methods and apparatuses for the production of such lenses.

The objects of the present invention include generally the more effective and practical grinding of lenses, especially bifocal lenses, by an apparatus and method assuring high accuracy, and improved product. A further object is to afford ready adaptability to various kinds and shapes of lens and various relative arrangements of the respective areas thereof. Another object is to afford an apparatus of compact and rugged construction and which is convenient of operation and control, readily adjustable to varying requirements, and of high output. Further objects and advantages of the invention will be explained in the hereinafter following description of an illustrative embodiment thereof or will be understood by those conversant with the subject.

To the attainment of such objects and advantages the present invention consists in the novel apparatus or machine for lens manufacture, and the novel method of such manufacture, herein illustrated or described, as well as various features of operation, combination, arrangement and detail.

In the accompanying drawings Fig. 1 is a front elevation of a lens reducing or grinding machine embodying the principles of the present invention.

Fig. 1ª, in top view and on a smaller scale, indicates an extended machine having gang operation to grind simultaneously and under a single control a number of lenses.

Fig. 2 is a top plan view of the machine shown in Fig. 1.

Fig. 2ª is a detached top plan view of one of the elements of Fig. 2 in modified form.

Fig. 3 is a vertical section view of part of the machine of Figs. 1 and 2 taken substantially on the line 3—3 of Fig. 2.

Fig. 4 is a vertical section view of certain parts looking from the front taken substantially on the line 4—4 of Fig. 2.

Fig. 5 is a vertical section view taken on the line 5—5 of Fig. 4.

Fig. 6 and 7 are central vertical section views showing the grinding tool of Figs. 1 to 3 adjusted to different positions for grinding different products; and Fig. 7ª is a front elevation showing the tool of Fig. 3 adjusted to an angular axis to complete the grinding of the lens partially ground as in Fig. 7.

Fig. 8 is a vertical central section view of a different form of grinding tool, and Fig. 9 is a vertical section of the same taken on the line 9—9 of Fig. 8.

Fig. 10 is one example, in face view, of a ground lens disk made in accordance with the illustrated machine, and with dotted lines indicating how said disk may be cut into an eyeglass lens.

Fig. 11 is an enlarged partial vertical section view of the lens disk of Fig. 10 taken on the line 11—11.

Figs. 12 and 13 are face views of other forms of lens which may be ground on the machine of this invention.

Figs. 14 and 15 are section views of examples of lenses of novel structure producible by this invention.

The lenses herein concerned may be described as having a general or major area of one form or spherical radius and curvature, and one or more special minor areas, referred to as segments, of different spherical curvature and diopter or power. Usually the general portion of the lens is for distance or far-vision use while the segment area is for near or reading vision, with extra power, and will be so referred to. The minor area may be of various outlines, circular, oval, polygonal or irregular, and positioned as desired, usually near the lower edge of the finished lens. In a typical case the lens may be constituted of a single piece of homogenous glass, without refractive index variation, the segment then differing from the general area in diopter by reason of differences in curvature, being formed for example to a shorter radius and with a shorter focus, as already indicated. However, as a novel product, a composite blank, having a special insert or segment of a different glass from the general body of the lens, may be reduced and finished, with this invention, in such a way that the power differences of the general and segment areas are modified by giving to the minor area or segment a different spherical form or curvature from the rest, as by reducing it to a shorter radius, thereby to enhance the difference in dioptric power due to the differences in the indexes of refraction of the two kinds of glass, such as crown and flint glass, or two different crown glasses.

The machine of the present invention is substantially universal in its capability of performing the above indicated and other operations, especially lens reducing by grinding, polishing or other operations to convert the original glass blank, or one side thereof, to the final lens or surface form. Conveniently the general elements of the machine may be first outlined, with subsequent complete description of the structure, arrangement and operation.

For reducing a glass blank to the form of a bifocal lens, or for reducing a portion of the surface thereof, the machine comprises the following cooperative main elements. A revoluble work table 24 is provided having means to support and position the blank near the middle thereof, the table preferably revolving horizontally about a vertical axis. A tool carriage 54 is provided shiftable above the table; this taking any mechanical form capable of the necessary shifting movements, substantially horizontally above the table. A tool shaft 75 is provided mounted in suitable bearings on the carriage and adapted at its lower end to carry and operate a grinding or other reducing tool 70 resting in contact upon the blank supported on the table; the tool being thereby shiftable with the carriage for the control of its operations upon the blank. A guide or flange 36 is provided surrounding the table, or at least circumferentially arranged with respect to the axis of revolution of the table and work, and mounted or connected to revolve with the table; this guide being in the nature of a cam which may however be concentric as well as eccentric, according to the work to be performed. A follower or pilot 64 is provided running or bearing on the guide or cam and connected to the carriage or tool, so that the contour of the guide determines the positions or movements of the carriage and tool and thereby the nature or pattern of the reducing operation. As will be explained it is preferred that the contour of the guide is subject to alteration so that any desired pattern of reducing operation may be predetermined according to the character of the lens to be produced.

The drawings show several of the many forms of lens that may be ground with this invention. Thus in Fig. 3 is shown a simple concavo-convex lens A, the grinding tool 70 being shaped and adjusted to afford a continuous spherical concave surface, the lower or convex surface being understood to be in a rough or approximate condition subject to final accurate grinding and polishing to accord with particular prescriptions.

In Fig. 6 is shown a second form of lens B wherein the grinding tool is shaped and adjusted to afford a segment at the center of the disk of different curvature than the general area.

Fig. 7 shows a lens C with special segment, which may be considered as partly formed, to be completed as in Fig. 7$^a$, and which lens may be described more particularly as follows, referring also to Figs. 10 and 11. Its convex surface $c$ may be considered as not yet finally ground. Its general interior or concave surface $c'$ is shown as finally ground, or in the process of being ground. The central portion $c^2$ of the lens Fig. 7 is to constitute a segment, and this is shown as being ground to a different curvature from the general concave area of the lens disk. While this may be considered a final grinding for certain lenses, the work may be carried further, as is shown in Fig. 7$^a$, wherein the grinding tool has been replaced by one adapted to perform a special or inclined grinding of the segment giving it a wedge shape $c^3$. The finished lens disk C is shown in Fig. 10 in face view which by dotted lines indicates how this may be cut into an outline for an eyeglass. In part the same lens disk is shown in central section view on an enlarged scale in Fig. 11.

Another form of lens D is shown in Fig. 12 with a special contour of segment $d^2$; and a further form of lens E is shown in Fig. 13 with a still different segment form $e^2$.

Fig. 14 in partial section shows a composite lens F having fused within its general area or body portion $f$ of crown glass a segment $f^2$ of different index as flint glass, the segment ground to a different form or radius than that of the body. For example, the segment in its final form is of wedge shape, partially protruding from the general surface. Fig. 15 shows another lens G with body $g$ and segment $g^2$ of different glass, in this case the segment being ground either above or below the general contour with a different spherical curvature.

In detail, the machine shown in Figs. 1 to 5 comprises a base 20 and, above the base, at the top of a system of posts 21, is a shelf 22 above which are arranged most of the operative parts of the machine, some of the driving parts being beneath the shelf.

The rotary table 24 which is to carry the work or lens blank is shown as comprising several parts, firstly, a flat plate 25 shown as being generally circular and having a hub 26 keyed at the top end of a rotary table shaft 27 and resting on a collar 28 pinned to the shaft. By these fittings the entire table and hub can be bodily removed and replaced.

By the same key 30 that attaches the table plate 25 to its vertical shaft a work holder or cup 31 is fitted at the top end of the shaft. By this arrangement the work table, the work cup and the work all rotate in unison with the shaft. The work holder or cup 31 is shown provided with an upstanding rim 32 upon the edges of which the lens blank or disk A rests. Preferably a cushioning means 33 such as plastic pitch is provided to fill the cup, affording a steady underneath support for the entire area of the blank. When the blank is initially set in position it compacts the cushioning material 33, and the rim 32 is provided with a series of notches 34, shown in Figs. 2 and 3, through which excess material may be squeezed as the blank is settled to working position. A surrounding wall 35 is shown constituting a receptacle to receive cushioning material escaped from the cup, also grindings etc.

Associated with the revoluble work table 24, and shown as a flange or rim on the plate 25, is the circumferential guide or flange 36. This guide member is shown of a form concentrically surrounding the axis of revolution of the table and work, and it rotates with the table and work; and, as will be later explained, cooperates with the pilot or follower 64 to determine the position or movements of the grinding tool, the contour of the guide 36 being changeable for this purpose. When the operative surface of the guide 36, either its inner or its outer surface, is a concentric circle there will be no lateral movement of the grinding tool during the operation. The operative contour however may be modified to produce the required movements of the tool. Thus, in Fig. 2 in dotted lines, is indicated the position of a cam strip or lug 38 attachable within the guide rim 36 at one side, so that as this part of the guide reaches the follower it will cause lateral movements of the grinding tool. The follower 64, the movements of which are controlled by the guide 36 and cam 38, is held in contact therewith by a spring to be described. In Fig. 2ª is shown a modification wherein the table 25ª has a rim or guide 36ª which is partly concentric and partly eccentric and may be interchanged at will for other forms of flanged table. This figure shows also a further modification in that the follower 64ª is exterior to the guide or rim and is drawn inwardly into contact therewith by a spring 68ª. In any case the table or plate may be permanent and the rim or guide flange interchanged according to requirements. They form a tray receiving and holding glass fragments, grindings, etc.

The table 25 may be driven at a relatively slow speed such as 20 to 50 revolutions per minute by driving connections such, for example as those shown at the lower part of Fig. 1. The shaft 27 is shown as passing through an upper bearing 40 at the underside of the shelf 22 and a lower bearing 41 upon the base 20, these preferably being ball bearings and providing for the working thrust of the parts, upward or downward.

For driving the work table shaft 27 it is shown as provided with a pulley 43 of large size connected by a belt 44 with a smaller pulley 45 on a vertical countershaft 46 turning in suitable bearings and carrying a larger pulley 47 in turn connected by a belt 48 driven by a small pulley 49 on a second countershaft 50, this in turn carrying a large pulley 51 driven by a belt 52 extending from the pulley of an electric motor or other source of power, the pulleys affording speed reduction. The speed of table rotation may be varied in any convenient way, and as a representative means therefor the pulley 45 is shown as comprising four pulley parts of different diameters adapted to operate through corresponding belts to drive the pulley 43 and shaft 27 at variable speeds.

Cooperating with the revoluble work table is a shiftable tool carriage 54 located above the table and carrying bearings which support the shaft 75 carrying the grinding tool. The tool carriage may be considered as built up of several members, comprising a pair of horizontal rods 55, and a series of cross bars clamped to the rods. Thus in Figs. 1 and 2 is shown a left end cross bar 56 and a right end cross bar 57. In the case of multiple or gang operation as indicated in Fig. 1ª the rods 55 may be lengthened indefinitely and cross bars applied at convenient intervals to the elongated tool carriage. Each cross bar is clamped to the carriage rods in a manner which permits loosening and shifting for adjustment. A supplemental cross bar 58 is similarly shiftable for adjusting the relation of the carriage to the follower 64.

The horizontal shiftability of the built-up carriage 54 may conveniently be provided by arranging the longitudinal rods 55 in slide bearings 60 located at various convenient points in the length of the rods. The bearings 60 are shown as attached on top of blocks or pedestals 61 arranged at the upper side of the shelf 22.

The determination of the position or movements of the tool carriage 54 by the circumferential guide 36 associated with the table 25 may be by means of the follower or pilot 64. This is shown as a small wheel or roll appearing in Figs. 1, 2 and 3 as bearing against the inner side of the guide rim 36. The follower roll 64 is shown as mounted at the lower end of a depending post 65. At its upper end the post 65 is reduced, forming a shoulder, and the reduced part extends upwardly through the cross bar 58, at the upper side of which it is tightly secured by a nut 66. The guide 36, with or without the cam attachment 38, is shown in the nature of an open cam operating upon and determining the movements of the follower 64 and the tool carriage; and to hold the follower in its operative engagement with the guide there is shown a strong spring 68, arranged to pull rightwardly on the tool carriage, thereby pressing the follower against the guide or cam.

While various reducing tools may be used with the described machine, there is shown in Figs. 3, 6 and 7 a compound grinding tool 70 comprising an annular grinding member 71 and a central or cylindrical grinding member 72 mounted adjustably within the aperture of the annular member. In such a structure the central member may be extended as a shank 73 to be rotated as will be described. This compound grinding tool is shown in three different adjustments in Figs. 3, 6 and 7, the two members being attached rigidly together in each adjustment by set screws 74. Thus, in Fig. 3 the two tool members are mounted in relatively flush arrangement, their grinding surfaces being in spherical alinement, for the grinding of the concave side of a simple lens. In Fig. 6 the adjustment has been altered so that the central member projects downwardly beyond the annular member, for the grinding of a special segment in the form of a recess below the general area of the lens. In Fig. 7 on the contrary the central member has been adjusted relatively upwardly or inwardly so that on the resulting lens disk the produced segment will stand out as a projection or boss, to be later finished off as already described in connection with Figs. 7ª, 10 and 11.

The grinding tool 70 may be rotated at relatively high speed, as 400 to 600 turns per minute, and may be mounted as follows. The stem or shank 73 of the tool is shown detachably coupled within the recessed lower end of the tool shaft 75. The shaft rotates in an upper bearing 76 and a lower bearing 77. A collar 78 on the shaft is arranged to rest down upon the lower bearing 77, thus limiting its downward movement. For grinding purposes the tool and shaft should be able to yield relatively upwardly, but must be held resiliently downward to afford the grinding pressure. For this purpose a strong compression spring 79 is confined between the upper bearing 76 and the collar 78. Above the spring is a collar 80 splined on the shaft so that the shaft can slide through it; there being preferably a ball bearing enclosed within the bearing member 76 and collar 80. The spring pressure may be adjusted by means of threads on the shaft engaged by the collar 78 as a nut, so that turning this collar further compresses or relaxes the spring. Initially when the grinding tool is set down upon the work this motion compresses the spring, affording the grinding pressure, the grinding thereafter proceeding under observation.

The tool shaft bearings 76 and 77 may be considered as part of a carrier 81, the body 81 of which is shown as a stout vertical bar having at its ends reduced extensions 82 engaged in apertures in the respective bearings and there secured by set screws 83. The tool shaft carrier 81 is shown bodily mounted upon a liftable member or bar 85 forming a part of the carriage 54. The mounting of the carrier 81 on the bar 85 is shown as a simple pivot provided by a horizontal pin 86. The pin 86 extends transversely of the carriage, and permits the carrier and the tool shaft to be adjustably swung about the pivot in order to set the tool at varying angles of operation. Thus, while the axis of the shaft and tool is shown vertical in Figs. 1 to 3, they may be adjusted and secured at varying slants, as in Fig. 7ª. Thus, extending leftward from the carrier 81 is shown a curved scale or sector 87 formed with a slot 88 concentric with the pivot 86, and a thumbscrew 89 passing through the slot and threaded into the bar 85. By this arrangement the thumbscrew can be loosened and the parts adjusted to any desired angle, with the aid of calibrations 90 on the sector and a cooperating index or finger 91 on the bar 85.

The carrier bar 85 may be bodily shiftable, as by swinging up, to lift the carrier, shaft and tool out of working position, for example to change the work or make adjustments. For this purpose the left end of the bar 85 is shown pivoted at 92 on the crossbar 56 while its free right end may be latched upon crossbar 57 by a latch 93. The latch or lock 93, best shown in Figs. 4 and 5, swings on a pivot shaft 94 turning in ears 95 atop the bar 57. When swung to latching position the latch surrounds or straddles the bar and is there secured by a set screw 96 passing through the latch top and arranged to press upon the bar, with a lock nut 97 to secure the set screw. Thus when in position the bar 85 on which the tool shaft carrier is mounted is held quite rigidly.

The operation of the machine of Figs. 1 to 5 has been indicated. As Fig. 3 shows, the tool 70 can grind a simple concave face on lens A, or if the tool central part is of different curvature from the annular part a lens as G Fig. 15 may be produced. Usual lubricating and abrading materials will be understood, and when ground, there may follow finishing in a usual way by usual polishing materials. The tool shaft 75 is vertical in these cases and the spring 79 furnishes the pressure. For the lens B of Fig. 6 or C of Fig. 7 the operation is similar, with the readjusted tool.

For inclined reduction, as to reduce the lens segment $c^2$ of Fig. 7 to a wedge segment $c^3$ as in Fig. 7ª, the tool shaft is set to the desired tilt and a small tool 70ª applied to the shaft as Fig. 7ª shows, affording a product as in Figs. 10 and 11 or Fig. 14.

For a non-circular segment, as in Fig. 12 or Fig. 13, the general part of the surface may be ground under control of a cam, as 38 Figs. 1–3, or 36ª Fig. 2, conforming to the desired outline of segment.

Figs. 8 and 9 show a special tool 100 working on the general part of a lens such as that of Fig. 15. A circular grinding block 101 has a central sink 102 and a peripheral projection 103. In the sink 102 rests a needle 104 about the point of which the block may rock as it plays over the work. A finger or fork 105 extending from the needle engages the projection 103 to compel rotation of the block. The needle has a head 106 sliding in a cross slot 107 of keyhole shape at the under side of the rotary shank 108. The needle and head are adjustable to positions eccentric or concentric to the axis of shank 108, being shown eccentric. For such adjustment the head has a threaded transverse bore engaging a threaded bolt 109 having a knurled end 110. When adjusted a lock nut 111 holds the parts.

When the needle 104 is set centrally of the shank 108 the needle rotates about its own axis and the grinding block 101 will be caused to rotaate about its own axis. This block is of dimension small enough to reach only the general part of the lens surface, without encroaching on the segment. When controlled by the follower 64 traveling around the concentric flange 36 the grinding may take an annular contour, such as that shown surrounding the segment $c^3$ in Fig. 10. When however the guiding flange is adapted in contour a segment of any desired outline may be left unground, such as those shown in Figs. 12 and 13.

When the needle 104 is set eccentrically as shown in Fig. 8 the grinding block 101 will not only spin in its own plane, but will undergo circular movements about the axis of the shank 108, thus giving a compound motion, which also is compounded with the relative rotation of the table and lens, affording a very effective type of grinding for certain purposes.

The fast speed of tool operation, whether rotation or oscillation, is not necessarily coordinated with the slow speed of revolution of the work table. Figs. 1 and 2 show a convenient mode of driving the tool. The tool shaft 75, above its upper bearing 76 is shown coupled with a flexible driving shaft 115 of ordinary kind such, for example, as is used for operating dentist's tools. The flexible shaft is of convenient length and its terminal rotates within a bearing 116 and carries a pulley 117. This pulley is shown connected by a belt 118 with the pulley of a driving motor 119. The motor is mounted on a support or platform 120 having a swivel mounting on the shelf 22. Extending axially above the support is a standard 121 at the top end of which the bearing 116 is mounted. By these arrangements the motor, drive belt and flexible shaft freely adapt themselves to changes in adjustment or movement of the tool shaft.

When the follower or roll 64 is to be adjusted relatively to the circumferential guide or cam 36, thereby to determine the position of the tool relatively to the work, this may readily be done by loosening the cross bar 58 on the carriage rods 55, readjusting the bar longitudinally of the carriage, and again clamping it in position. The carriage cross bars 56 and 57 are similarly adjustable longitudinally by unclamping and reclamping. When the tool shaft 75 and its carrier 81 are to be changed from the vertical position shown in Figs. 1 and 3 to an inclined position such as shown in Fig. 7ª, by tilting them about the pivot pin 86 and securing them by the thumbscrew 89, this may require readjustment of the cross bars 56 and 57 relatively to the carriage rods 55, or at least relatively to the cross bar 58 which carries the follower 64.

The carriage as shown has a strictly horizontal longitudinal motion under the control of the follower 64 and guide or cam 36, the slideway 60 being provided for this purpose at the top of the upright columns 61. A substitute arrangement having certain advantages is to replace the columns 61 by substantially upright links pivoted to the shelf 22 and to collars on the carriage rods 55, thus eliminating sliding movements and providing longitudinal movements of arcuate form, the curvature of which may be minimized by lengthening the swinging or rocking links or arms and pivoting them at a low level in the machine.

I claim:

1. A machine for reducing a glass blank to the form of a bifocal lens, comprising a revoluble work table having means to support and position the lens blank near the middle thereof, and mounted to revolve about a fixed-position vertical axis, a tool carriage having horizontal slide portions and slideways for such horizontal portions, whereby the carriage is horizontally shiftable above the table during reducing operations, a tool shaft mounted to rotate in bearings on said carriage and adapted to carry and operate a reducing tool in contact upon the blank supported on the table, a circumferential guide surrounding the axis of revolution of the table and mounted to revolve unitarily therewith, a follower spaced outward of the work and bearing on said guide, and means mounting said follower on said carriage thereby to shift in a horizontal plane when actuated by said guide, whereby the contour of the guide determines the positions or movements of the carriage and tool, and thereby the pattern of the reducing operation.

2. A machine for reducing a glass blank to the form of a bifocal lens, comprising a work table revoluble about an upright axis and having means to support and position the lens blank near the middle thereof, a carrier for a rotatable tool shaft shiftable during reducing operations in relation to and above the table, while the reducing tool operates in contact upon the blank supported on the table, a shiftable carriage on which said carrier is mounted, and means in the carrier mounting permitting the carrier to be adjusted as to the angle of the tool shaft and there fixed to predetermine the angle of operation, a circumferential guide associated with and surrounding the revolution axis of the table and mounted to revolve unitarily therewith, a movable follower spaced outward of the work and bearing cooperatively on said guide to be controlled thereby, means mounting said follower to shift in a horizontal plane when actuated by said guide, and connections from said follower to said shiftable carriage to effect shifting of such carriage and thereby the carrier and tool during reducing operations, whereby the contour of the guide determines the positions and movements of the carrier and tool, and thereby the pattern of the reducing operation.

3. A machine for reducing a glass blank to the form of a bifocal lens, comprising a work table revoluble about an upright axis and having means to support and position the lens blank near the middle thereof, said table being in the form of a horizontal plate, a carrier for a rotatable tool shaft shiftable during reducing operations in relation to and above the table, while the reducing tool operates in contact upon the blank supported on the table, a circumferential guide associated with and surrounding the revolution axis of the table and mounted to revolve unitarily therewith, said guide being in the form of a rim flange on said table plate thereby providing a tray, a movable follower spaced between said rim flange and the work and bearing upon the inner side of said guide to be controlled thereby, and connections from said follower to said tool carrier to effect shifting of such carrier and tool during reducing operations.

4. A machine for reducing a glass blank to the form of a bifocal lens, comprising a work table revoluble about an upright axis and having means to support and position the lens blank near the middle thereof, a carrier for a rotatable tool shaft shiftable during reducing operations in relation to and above the table, while the reducing tool operates in contact upon the blank supported on the table, said table being in the form of a tray associated with and surrounding the revolution axis of the table and mounted to revolve unitarily therewith, said tray having a bottom plate and an upstanding circumferential flange, a horizontally movable follower spaced outward of the work and bearing cooperatively on said tray flange to be controlled thereby, and connections from said follower to said tool carrier to effect shifting of such carrier and tool during reducing operations, whereby the contour of the tray flange determines the positions and movements of the carrier and tool, and thereby the pattern of the reducing operation, while the tray is adapted to catch and hold grindings and abrasive.

5. A machine for reducing a glass blank to the form of a bifocal lens, comprising a revoluble work table having means to support and position the lens blank near the middle thereof, and mounted to revolve about a fixed-position vertical axis, a tool carriage bodily shiftable above the table during reducing operations, a tool carrier mounted adjustably upon the carriage, a tool shaft with bearings mounted on said carrier and adapted to carry and operate a reducing tool in contact upon the blank supported on the table, a circumferential guide or cam surrounding the axis of revolution of the table and mounted to revolve unitarily therewith, a follower spaced outward of the work and bearing on said guide, and connections from said follower to said tool carriage to effect shifting of such carriage, carrier and tool; there being a retractible member (85) constituting part of the carriage, and the tool shaft carrier being mounted on said retractible member, permitting bodily retraction for access, and with means to latch the same in position during operation.

6. A machine for reducing a glass blank to the form of a bifocal lens, comprising a revoluble work table having means to support and position the lens blank near the middle thereof, and mounted to revolve about a fixed-position vertical axis, a tool carriage bodily shiftable above the table during reducing operations, a tool carrier mounted adjustably upon the carriage, a tool shaft with bearings mounted on said carrier and adapted to carry and operate a reducing tool in contact upon the blank supported on the table, a circumferential guide or cam surrounding the axis of revolution of the table and mounted to revolve unitarily therewith, a follower spaced outward of the work and bearing on said guide, and connections from said follower to said tool carriage to effect shifting of such carriage, carrier and tool; the tool shaft carrier having means mounting it for tilting adjustment of the carrier and shaft on the carriage and for fixing such adjustment.

7. A machine as in claim 6 and wherein is a scaled sector and index device to determine the angle of tilt, and a set screw or means to hold the adjustment.

JOHN D. GAMBLE.